March 27, 1956    J. S. DALE    2,740,054
SPEED CONTROL APPARATUS
Filed Sept. 25, 1952
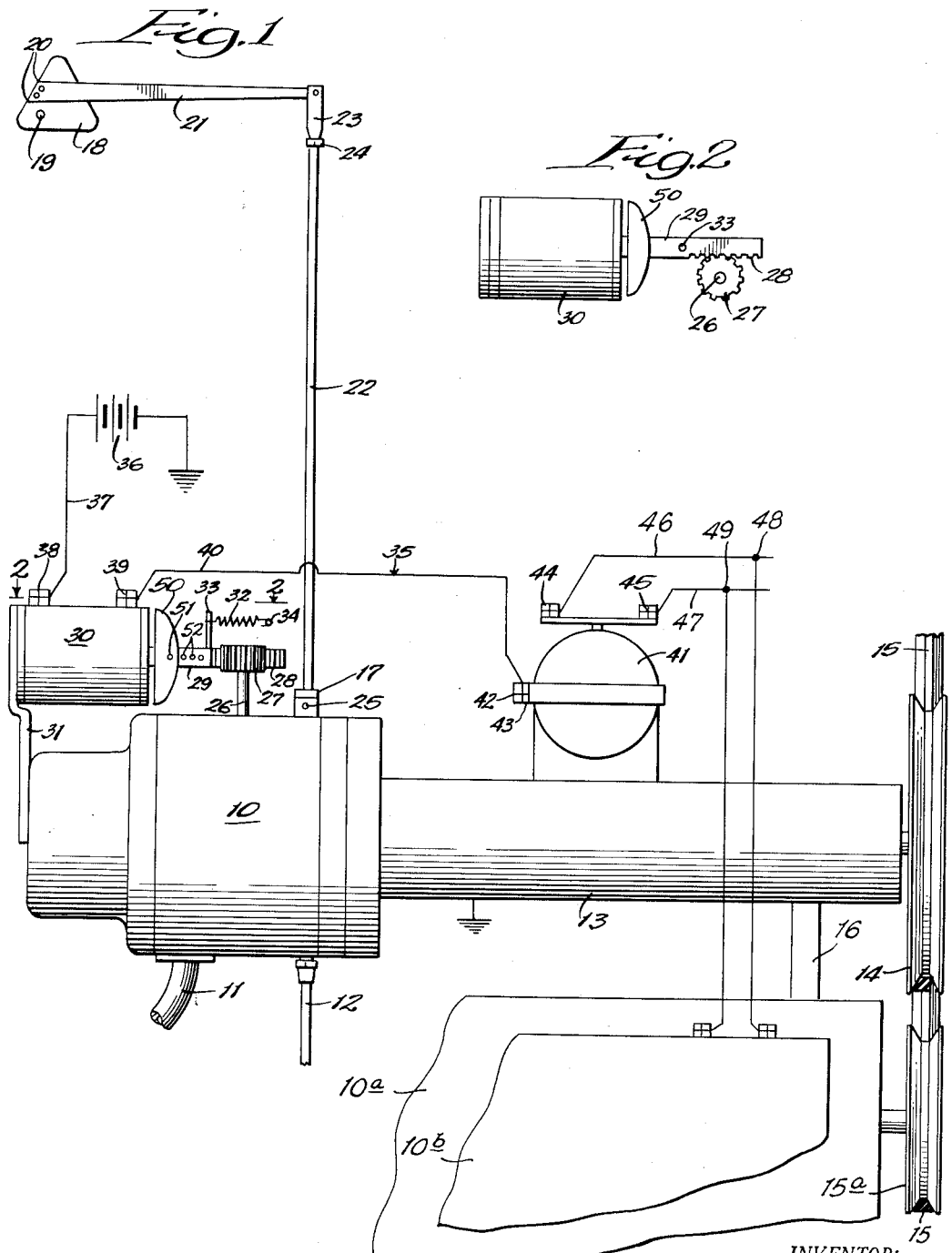
INVENTOR:
Joseph S. Dale,
BY Dawson, Tilton & Graham,
ATTORNEYS.

United States Patent Office 2,740,054
Patented Mar. 27, 1956

2,740,054

SPEED CONTROL APPARATUS

Joseph S. Dale, Rockford, Ill., assignor to Dale Hydraulic Controls, Inc., Rockford, Ill., a corporation of Illinois Application September 25, 1952, Serial No. 311,387

10 Claims. (Cl. 290—40)

This invention relates to speed control apparatus, and more particularly to apparatus for rapidly changing the operating speed of a prime mover when a unit driven by the prime mover is subjected to an instantaneous change from no load to loaded condition, and the apparatus then functions to stabilize the prime mover at the selected load speed.

This invention has particular application with electric welders and will be described with reference thereto. However, it is not intended that the invention be limited in this respect.

It is common in both plants and in the field to use electric welders wherein each welder is a self-contained unit having a generator as the power source which is driven by a prime mover. Generally the prime mover is either a diesel or a gasoline engine. In welding apparatus of this type the generator is subjected to instantaneous load changes and the prime mover must respond to these load changes so as to drive the generator at a speed which will enable it to supply the needed power for the welding operation. Before an arc is struck, the generator output circuit is normally open and the generator is therefore unloaded and only a very small load is applied to the prime mover. When an arc is struck, however, it is the usual practice for the "welder" to scratch the welding rod over the welding surface and this creates an instantaneous load across the generator output and places a very heavy load upon the generator. This of course applies a heavy load to the prime mover, and control apparatus must be used to compensate the prime mover for the heavy load placed thereon and to stabilize its speed so that the generator will be rotated rapidly enough to supply the needed welding power.

In the past, no known apparatus has been capable of satisfactorily changing the speed of a prime mover rapidly enough to compensate for the heavy load placed thereon when a welding arc is struck. If the prime mover was operating at a no load idling speed which was relatively low, compensating apparatus would have to rapidly increase the operating speed of the prime mover when the generator was loaded. Prior apparatus designed to accomplish this result were wholly unsatisfactory under field conditions, though they often performed satisfactorily under laboratory conditions, and the common practice has been to operate the prime mover at a no load idling speed which was very high and greatly in excess of the operating speed of the prime mover when the generator was loaded. The result, then, was that when an arc was struck by the "welder," and the generator was thereby instantaneously loaded, the speed of the prime mover would fall to the required operating speed for loaded condition.

This arrangement was undesirable because the consumption of fuel was high and this factor alone considerably increased the cost of operating the welder. Further, wear and tear on both the prime mover and generator were increased because of the high rate of speed at which the prime mover had to be idled.

An object of this invention, then, is to provide speed control apparatus permitting a prime mover to be operated at a low idling speed when unloaded, so as to overcome the disadvantages set out. Another object of the invention is to provide speed control apparatus wherein the operating speed of a prime mover may be rapidly changed from a low no load idling speed to a relatively high operating speed when the prime mover and apparatus driven thereby are subjected to large instantaneous load increases. Still another object of the invention is to provide speed control apparatus that may be used with conventional governors to rapidly increase the operating speed of a prime mover when it is subjected to instantaneous load increases. A further object of the invention is to provide speed control apparatus for use with conventional governors that will not affect the normal operation of the governors. Still a further object is that of providing electrical apparatus for use with a conventional governor controlling the operation of a prime mover and that will rapidly change the operating speed of the prime mover when it is subjected to instantaneous load increases while not affecting the normal operation of the governor and its control operation. Further objects and advantages will appear as the specification proceeds.

My invention is shown in an illustrative embodiment by the accompanying drawings, in which—

Figure 1 is a diagrammatic view of the apparatus comprising my invention; and Fig. 2 is a top plan view taken on the line 2—2 of Fig. 1.

The apparatus illustrated in the drawings is typical of speed control apparatus embodying my invention that may be used with electric welders wherein a prime mover drives a generator. Any suitable prime mover 10a may be used to drive the generator 10b for supplying welding current. Mounted upon the prime mover is a governor 10. Any suitable governor may be employed that operates to control the operating speed of the prime mover and that has a speed selection member that is adjustable to establish the operating speed of the prime mover. Preferably the governor 10 is hydraulic and may have a tube or conduit 11 secured to the governor casing and communicating with the oil sump of the prime mover. A tube or conduit 12 is connected to the oil supply or pressure line of the prime mover and brings oil under pressure to the governor. Preferably a self-contained hydraulic governor is employed that has its own sump and pump, thereby eliminating the conduits 11 and 12. However, the lubricating oil of the prime mover may be used, if desired. A typical hydraulic governor that may be employed is described in detail in my Patent No. 2,571,842 for Governor Mechanism, or a governor such as that described in detail in my co-pending application, Serial No. 139,076, for Hydraulic Speed Governor, may be used.

Governors for prime movers are generally equipped with a drive shaft connected to the controlled prime mover and driven thereby. For this purpose the drive shaft of the governor 10 is driven by the prime mover through a governor adaptor 13 which may be a step-up gearing arrangement and a pulley wheel 14 driven by the fan belt 15 through the drive pulley 15a of the prime mover. Any drive means may be used to provide the speed ratio desired. The governor adaptor 13 may be supported upon the prime mover in any suitable manner such as by a bracket 16.

The governor 10 is equipped with a movable control member 17, that may be a servo motor if a hydraulic governor is employed. The servo motor or control member 17 reciprocates in response to changes in the operating speed of the prime mover through the internal governor mechanism. The movable control member 17 is coupled to the speed control adjustment of the prime mover 18 which may be the fuel rack of a diesel or the throttle of a gasoline engine or of a steam engine. The member 17 is pivotally mounted by means of pin 19 upon the prime mover and rotation thereof about the pin or pivot point 19 serves to increase or decrease the fuel supply of the prime mover. Rigidly pinned to the member 17 by rivets 20 is a throttle arm 21 pivotally secured to a shaft or rod 22 through a coupling or joint 23. Preferably the shaft 22 is threaded and is adjustably received within the joint 23 so as to effectively lengthen or shorten the length of the shaft. A nut 24 may be employed for locking the shaft 22 at the desired position. The shaft 22 is pinned at 25 to the member 17.

The governor 10 is equipped with an adjustable speed selection member 26 that may be selectively positioned to establish the prime mover speed and the speed at which the governor will hold the prime mover. The structure described so far is conventional and operates to hold the engine or prime mover at the operating speed determined by the setting of the speed selection member 26 when the engine or prime mover is subjected to varying loads.

The speed selection member 26 is equipped at its upper end with a pinion gear 27. The pinion gear 27 meshes with a rack or sector gear 28 formed integrally with or otherwise rigidly secured to the plunger 29 of a solenoid 30. A bracket 31 rigidly secured to the casing of the governor 10 provides a mounting for the solenoid 30. The plunger 29 of the solenoid is biased or normally held in its outermost position by means of a spring 32 secured at one end to an upwardly-extending pin or arm 33 mounted upon the plunger 29 and at its other end to a stationary pin 34 which may be mounted upon the prime mover. Movement of the plunger 29 from its outermost position and into the solenoid coil when the solenoid is energized moves the rack gear 28 which rotates the pinion gear 27 and speed selection member 26 so as to change the operating speed of the governor-controlled prime mover.

A circuit designated generally by the numeral 35 is utilized to energize the solenoid 30. The circuit 35 may consist, for example, of a source of electrical energy such as the battery 36 of the engine or prime mover which may be grounded on one side and connected through a lead 37 to a terminal 38 of the solenoid. The circuit is completed through terminal 39, lead 40, and relay 41 which may be grounded on one side through the governor adaptor 13, as shown.

The relay 41 provides a contact 42 to which the lead 40 is connected and a contact 43 which is grounded through the relay, etc. Normally the contacts 42 and 43 are spaced apart, but when the relay is energized the contacts close and the energizing circuit for the solenoid 30 is completed.

The relay energizing coil terminates at one end in a terminal 44 and at its other end in a terminal 45. Leads 46 and 47 are connected respectively to the terminals 44 and 45 and are connected at 48 and 49 to a low voltage circuit of the welding generator that is closed when an arc is struck. Preferably the points 48 and 49 are tapped into this low voltage circuit so that a very small current flows through the energizing coils of the relay 41 when the generator output circuit has current flowing therethrough. When current flows in the output of the welding generator, as when an arc is struck and the welding operation is carried on, a small current flows through the relay coils and the relay 41 is energized, thereby completing the solenoid circuit. However, when the welding generator does not have current flowing in the output thereof—this condition exists when the actual welding operation is not being carried on—the relay 41 is not actuated and the energizing circuit for the solenoid 30 is not completed.

Often during the welding operation a type of intermittent action inadvertently results when the welding rod is not steadily fed into close proximity with the material being welded as the welding rod is consumed. The arc is temporarily extinguished and the "welder" quickly moves the tip of the welding rod close to the material being welded and the arc is again struck. The time to accomplish this is extremely short but the rapid action of the relay 41 would instantaneously break the solenoid energizing circuit when the arc was extinguished and the solenoid plunger, under the urging of the spring 32, would move the speed selection control 26 of the governor to a new position. I avoid this result by equipping the plunger 29 of the solenoid 30 with a plug or member 50 made of iron or steel. The plug 50 is axially adjustable upon the plunger 29 and may be secured in the desired position by any suitable means such as a set screw or by means of a pin 51 that can be extended selectively through spaced apertures 52 in the plunger.

If the magnetic plug or member 50 is positioned on the plunger 29 so as to be brought very near the solenoid coils when the plunger is moved to its most inward position, the residual magnetic field remaining about the solenoid coils when the contacts 42 and 43 of the relay 41 have been opened and the solenoid energizing circuit is broken will act upon the plug 50 and hold the plunger 29 in the inward position for a short interval; thus producing a time delay of sufficient duration to permit the welder to re-strike the arc before the speed selection member of the governor is moved. On the other hand, if the plug 50 is positioned outwardly upon the plunger 29 or it is spaced a substantial distance from the solenoid coils when the plunger is in its innermost position, the residual magnetic field will have less effect upon plug 50 and a smaller time delay—or no time delay, depending upon the position of the plug—will result before the plunger is returned to its outermost position upon the breaking of the energizing circuit 35.

*Operation*

Assuming that the governor 10 is properly connected to the prime mover and that the other elements of my apparatus are properly connected, the speed selection member 26 and pinion gear 27 are adjusted or interrelated with the plunger and rack gear 28 so that when the plunger 29 is in its outermost position and held there by the biasing action of the spring 32, the speed selection member 26 is adjusted to a speed setting that will operate the prime mover at some desired low no load idling speed. The gears 27 and 28 are chosen so that upon movement of the plunger 29 to its innermost position when the energizing circuit for the solenoid 30 is completed, the speed selection member 26 will be positioned at a point establishing the speed of the prime mover at the required full load operating speed. The latter speed will be substantially higher than the low idling speed of the prime mover. The points 48 and 49 are tapped to the generator output circuit as desired to bring about actuation of the relay 41 when the generator output circuit has current flowing therethrough. The pulley 14 is connected to the belt 15 and the prime mover is started.

The prime mover will operate at a low speed determined by the setting of the speed selection member 26 and will continue to operate at this speed until a load is applied to the welding generator. When the welding rod is brought into contact or close to the material being welded, an arc is struck and instantaneously a very heavy load is placed upon the welding generator. In the event that the welding rod actually touches the material being welded, the load is a short circuit. Immediately current flows in the output circuit of the generator and a small current flows through the leads 46 and 47 and the relay 41 is actuated. The contacts 42 and 43 of the relay 41 are closed and the actuating circuit for the solenoid 30 is completed. Current flows through the solenoid coils and the plunger 29 is moved into the coils and to its innermost position and the speed selection member 26 is thereby moved or rotated to the full load speed setting. All of the above action is very rapid because of the characteristics of electricity and is limited only by the inertia of the solenoid and relay. The time lag caused by the inertia of these elements may be kept small by proper design or choosing of the elements. The rotating of the speed selection member 26 to the full load speed setting is seen, then, to follow very closely behind the loading of the generator, and the time delay is almost imperceptible.

The governor 10 then operates in the usual manner to adjust the speed of the prime mover so that it corresponds to the setting of the speed selection member 26. To this end the control member 17 moves the shaft 22 and throttle arm 21 in a direction to supply the prime mover with more fuel (in the case of an engine) and thereby bring up the operating speed thereof. The relay 41 will remain actuated so long as current flows in the output circuit of the generator and the solenoid 30 will therefore remain energized. The setting of the speed selection member 26 will remain stationary and the governor 10 operates in the usual manner to adjust the operating speed of the prime mover to compensate for small or slow changes in the loading of the generator and therefore the loading of the prime mover.

The magnetic plug 50 may be adjusted as desired to provide the solenoid 30 with a sufficient time delay upon extinguishing of the welding arc to prevent vacillation of the speed selection member 26 and general instability of the speed control apparatus when the welding arc is instantaneously and inadvertently extinguished during the welding operation.

The apparatus of my invention is readily installed upon electric welders of the type described that are equipped with conventional governors. The operation of my invention in no way disturbs the usual functioning of the engine governor and the control of the engine or prime mover exerted by the governor. The apparatus supplements the usual governor action by bringing about very rapid response to load changes that are very large and that are brought about instantaneously. Mechanical governors alone are not capable of correcting the engine speed rapidly enough to accommodate loads of this character.

The rapid rate of response achieved through use of my invention permits the prime mover for a welding generator to be operated at a no load idling speed that is very low, and a tremendous savings in both the operating costs and maintenance costs are thereby realized. The time delay means embodied in the adjustable plug 50 lends stability to the welding apparatus that facilitates the welding operation and often improves the character of the weld. Not only is there a rapid response to heavy loads placed on the welding generator so as to increase the prime mover operating speed from a low no load idling speed to a higher operating speed, but the reverse action is comparable; that is, when the prime mover is operating at load speed and the welding arc is extinguished, the operating speed of the prime mover is rapidly returned to its low idling speed. This also results in a tremendous saving of fuel and a comparable reduction in the operating costs. Further, I prefer to employ a hydraulic governor, since such governors are fast acting and respond quickly to changes in the speed control setting so as to change the operating speed of the prime mover with very little time lag. Such a governor, then, may be used advantageously since it amplifies the desirable speed change rates.

While in the foregoing specification I have described in great detail an embodiment of my invention for purposes of illustration, it is clear that the details of my invention may be varied greatly by those skilled in the art without departing from the spirit of the invention.

I claim:

1. In apparatus for changing the speed setting of a governor in response to a load change on electrical apparatus driven by a governor-controlled prime mover, a governor arranged with said prime mover for adjusting the speed control thereof to correspond the prime mover speed to the speed setting of the governor, said governor being equipped with an adjustable speed selection member, electrical means having a movable element connected to said speed selection member and biased in one position and movable to another position upon energizing of said means, a circuit for energizing said means including means connected to the output of the electrical apparatus and adapted to complete said circuit upon the flow of current in the output of said electrical apparatus, and time delay means arranged with said electrical means and being operative to momentarily delay movement of said movable element upon interruption of the flow of current in the output of said electrical apparatus.

2. In combination with a prime mover driving electrical apparatus subjected to intermittent loads, a governor for said prime mover and arranged therewith to operate said prime mover at a speed corresponding to the speed setting of the governor, said governor being equipped with an adjustable speed selection member, a solenoid having a movable plunger connected to said speed selection member and being adapted upon energizing of the solenoid to move said member from one speed setting to a different speed setting, a circuit for energizing said solenoid, means in said circuit and connected to said electrical apparatus for completing said circuit to energize said solenoid when said electrical apparatus is subjected to a load, and time delay means arranged with said solenoid and being operative to momentarily delay the movement of said plunger upon the removal of a load from said electrical apparatus.

3. In combination with a prime mover driving an electric generator subjected to intermittent loads, a governor for said prime mover and arranged therewith to operate said prime mover at a speed corresponding to the speed setting of the governor, said governor being equipped with an adjustable speed selection member, a solenoid having a movable plunger connected to said speed selection member and being biased to position said member at a low no load speed setting and adapted upon energizing of the solenoid to move said member to a higher full load speed setting, a circuit for energizing said solenoid, a relay connected to the output of said generator and adapted to be actuated when said generator is subjected to a load to complete said circuit for energizing said solenoid, and time delay means carried by said plunger and being operative to momentarily delay the movement thereof when a load is removed from said generator.

4. In apparatus for use with electric welders wherein the welding power source is an electric generator driven by a prime mover, said apparatus being adapted to change the speed of the prime mover from a low idling speed when the generator is unloaded to a higher speed when the generator is loaded, the combination comprising governor means for controlling the engine speed, said governor means having a speed setting member for selecting the operating speed of said prime mover, electrically operated means connected to said member for changing the setting thereof from a low speed when said generator is unloaded to a higher speed when the generator is loaded, and circuit means arranged with said generator and adapted to energize said electrically operated means when said generator is loaded, said electrically operated means being equipped with a time delay means for momentarily delaying a change in the setting of said member when a load is removed from said generator.

5. In speed control apparatus adapted for use with a prime mover driving a welding generator, a governor equipped with a speed selection member and having a movable speed control member connected to said prime mover and adapted to change the operating speed thereof to establish the prime mover at a speed corresponding to the setting of the speed selection member, a solenoid equipped with a plunger, means connecting said plunger to said speed selection member and being adapted to move the same upon movement of said plunger, a relay, an energizing circuit for said solenoid through said relay, and an energizing circuit for said relay through the output circuit of the welding generator, said plunger being equipped with an axially-adjustable plug of magnetic metal to provide said solenoid with a selective time delay.

6. The structure of claim 5 wherein said governor is hydraulic and has a drive shaft driven by said prime mover.

7. Apparatus for use with electric welders wherein the welding power source is an electric generator driven by an engine, said apparatus being adapted to change the speed of the engine from a relatively low idling speed when the generator is unloaded to a higher speed when the generator is loaded, comprising a hydraulic governor equipped with an adjustable speed selection member and having a control member movable in response to a difference between the operating speed of the engine and the speed setting of the speed selection member, means coupling said governor to the engine, means connecting said control member to the fuel supply control of the engine, a solenoid having a plunger connected to the speed selection member of said governor and adapted to move the same upon movement of the plunger, an energizing circuit for said solenoid, a relay in said circuit for completing the same upon actuation of said relay, and means connecting the actuating coils of said relay to the output circuit of said generator, whereby said relay is actuated when current flows through the output circuit of said generator to energize said solenoid and change the setting of said speed control member, said solenoid being provided with a time delay means to detain the movement of said plunger upon de-energizing of the solenoid.

8. In apparatus of the character described wherein the setting of control means is responsive to the position of a solenoid plunger, a solenoid equipped with a plunger extending outwardly therefrom and being arranged with said control means for establishing the setting thereof, a circuit for energizing said solenoid, and time delay means arranged with said solenoid for momentarily detaining the movement of said plunger in the direction of its bias upon the interruption of said circuit and de-energizing of said solenoid, said time delay means comprising a plug of magnetic material carried by the outwardly extending portion of said plunger and providing a fixed inertia to be overcome and providing also a varying magnetic attraction to be overcome that is proportionate in magnitude to its position on said plunger with respect to the solenoid winding.

9. The structure of claim 8 in which said plug of magnetic material is adjustably carried by the outwardly extending portion of said plunger.

10. In combination with engine driven apparatus subject to sudden changes between loaded and unloaded conditions, said engine being equipped with a governor having an adjustable speed selection member for selectively establishing engine speed, electrical means having a movable element connected with said speed selection member and being biased to normally hold the same in a selected position of adjustment corresponding to one of the aforesaid conditions but being movable to shift said speed selection member to another position of adjustment corresponding to the other of the aforesaid conditions, a circuit for energizing and de-energizing said electrical means to shift said element, means in said circuit and being connected with said apparatus and responsive to a change between the loaded and unloaded conditions thereof to selectively interrupt and complete the circuit, and time delay means arranged with said electrical means and being operative to delay movement of said movable elements on a change in condition of said circuit.

References Cited in the file of this patent

UNITED STATES PATENTS

| | | |
|---|---|---|
| 986,216 | Poth | Mar. 7, 1910 |
| 1,178,596 | Okey | Apr. 11, 1916 |
| 1,456,284 | Shivers et al. | May 22, 1923 |
| 2,004,404 | Gumpper | June 11, 1935 |
| 2,172,026 | Longley | Sept. 5, 1939 |
| 2,182,030 | McEniry | Dec. 5, 1939 |
| 2,242,072 | Holslag | May 13, 1941 |
| 2,318,359 | Bellows, Jr. | May 4, 1943 |
| 2,396,176 | Hobart | Mar. 5, 1946 |
| 2,488,171 | Campbell | Nov. 15, 1949 |
| 2,571,842 | Dale | Oct. 16, 1951 |

OTHER REFERENCES

Publication, "New Solenoid Mechanism for Magne-Blast Breaker," Wyman & Keagy, Dec. 27, 1944.